April 10, 1928.  1,665,308
L. A. LAURSEN
PROCESS OF VULCANIZING RUBBER TUBES AND RUBBER
TUBE PRODUCED THEREBY
Filed March 14, 1923   3 Sheets-Sheet 1

Inventor
L. A. Laursen
By Robb Robb & Hill
Attorneys

Inventor
L. A. Laursen
By Robb Robb Hill
Attorney

April 10, 1928.

L. A. LAURSEN 1,665,308

PROCESS OF VULCANIZING RUBBER TUBES AND RUBBER TUBE PRODUCED THEREBY

Filed March 14, 1923

Inventor

L. A. Laursen

By Robb, Robb & Hill

Attorneys

Patented Apr. 10, 1928.

1,665,308

UNITED STATES PATENT OFFICE.

LAURITS A. LAURSEN, OF EAU CLAIRE, WISCONSIN, ASSIGNOR OF ONE-FOURTH TO PEARL FISHER LAURSEN, OF AKRON, OHIO.

PROCESS OF VULCANIZING RUBBER TUBES AND RUBBER TUBE PRODUCED THEREBY.

Application filed March 14, 1923. Serial No. 624,977.

The present invention relates to a process of and apparatus for vulcanizing rubber articles, and has for its object to provide for the vulcanization of such rubber articles as tubes by what is known as the wet process, and without the necessity of using rags or wrappings of any kind on the outside of the gum stock.

At the present time the method generally in use for manufacturing inner tubes consists in rolling a sheet of rubber compound upon a cylindrical metal tube and then tightly wrapping the rubber compound with a fabric strip which is wound spirally thereon under tension, after which the metal tube with the wrapped rubber stock thereon is placed in an open steam vulcanizer and exposed to steam under pressure until the rubber has been completely vulcanized. The fabric wrapping is then removed and the vulcanized rubber tube stripped from the metal tube or pole. In the act of stripping, the rubber tube is turned inside out so that the face thereof which was in direct contact with the metal tube during the process of vulcanizing and which is accordingly smooth is on the outside of the finished tube.

The face of the tube which was in contact with the fabric wrapping strip has the impression of the fabric molded therein and is not only rough but is corrugated spirally, due to the spiral winding of the fabric strip on the uncured rubber. These tubes have been found to be non-uniform in thickness, and the tensile strength of the tubes varies at different parts thereof. The rag markings upon the tubes not only provide an unsightly surface that must be concealed from the customer by turning the tubes inside out as they are stripped from the metal tubes, but result in weakening the tube in different zones or areas so that the tube is not uniform in thickness and strength. Furthermore, the fabric strips or rags which are used in wrapping the tubes are exposed to the water and steam at alternately high and low temperatures, with the result that they rapidly deteriorate, and the cost of these wrappings add very considerably to the expense of manufacturing the tubes.

The object of the present invention has been to provide for the manufacture of such articles as rubber tubes without the necessity of using any rags or wrappings of any kind, thereby eliminating the expense of providing and applying the rags, and also enabling a tube to be produced which is free from the rag markings and is far more uniform in thickness and tensile strength than the tubes which were produced by the old method. According to my method, the rubber articles or tubes are vulcanized by what is known as the wet process, although they are subjected to a comparatively high pressure while being vulcanized. This pressure is obtained without raising the vulcanizing temperature above the desired point, which is approximately 292 degrees Fahrenheit. The cost of the fabric wrappings and the expense of applying and removing the same is entirely eliminated, and the tubes which are produced are free from the fabric markings which are unsightly and tend to weaken the tube in various zones and areas.

For a full understanding of the invention, reference is to be had to the following description and accompanying drawings in which.

Corresponding and like parts are referred to in the following description, and indicated on all of the views of the drawings by like reference characters.

Figure 1:
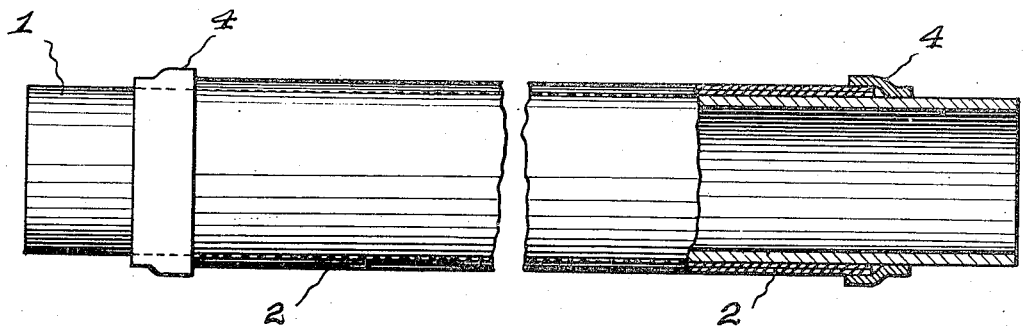
Figure 1 is a side elevation of a tube or mandrel with the rubber stock applied thereto preparatory to being vulcanized, portions being broken away and shown in section.
Figure 2:
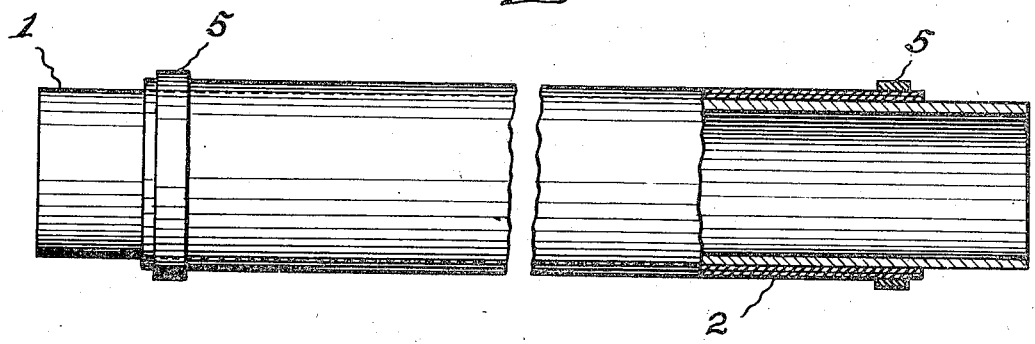
Figure 2 is a similar view, showing a slightly different manner of securing the ends of the rubber stock to the mandrel or tube.
Figure 3:
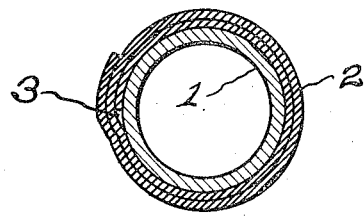
Figure 3 is a transverse sectional view thru the mandrel and rubber stock, showing the manner in which the rubber stock is ordinarily rolled upon the mandrel.
Figure 4:
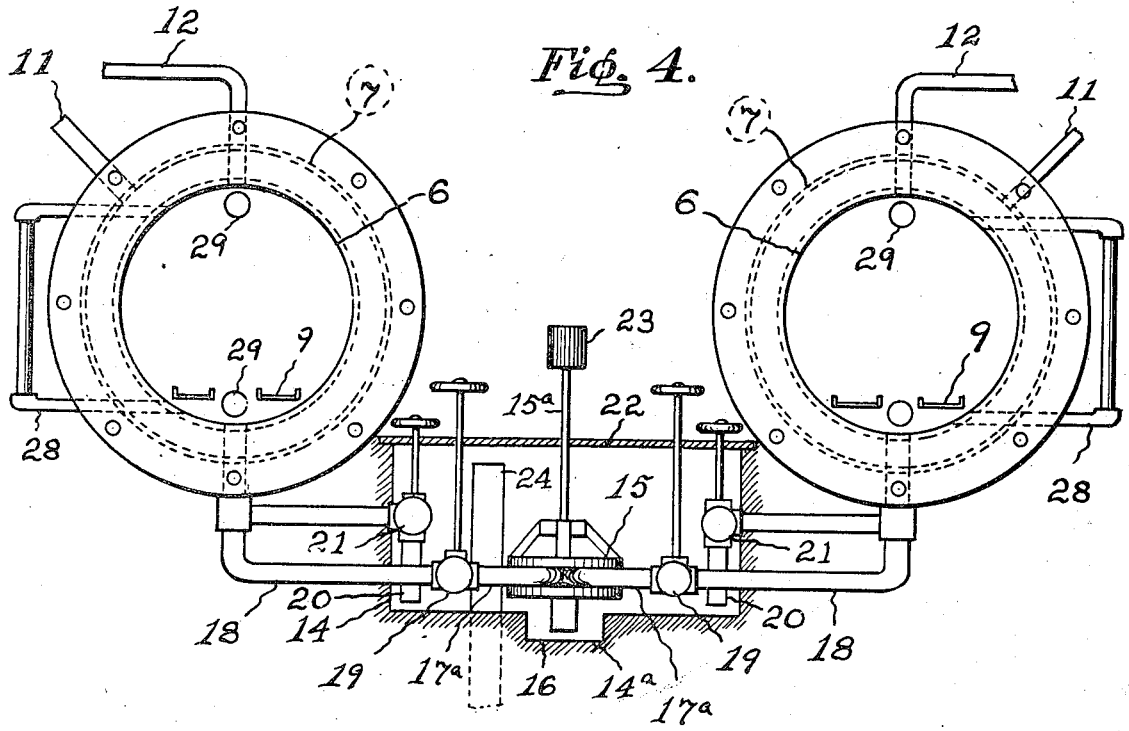
Figure 4 is an end view of a vulcanizing apparatus which is constructed in accordance with the invention, the covers or doors of the vulcanizing chambers being removed, and the tank into which the water from chambers is adapted to be drained being shown in section.
Figure 5:
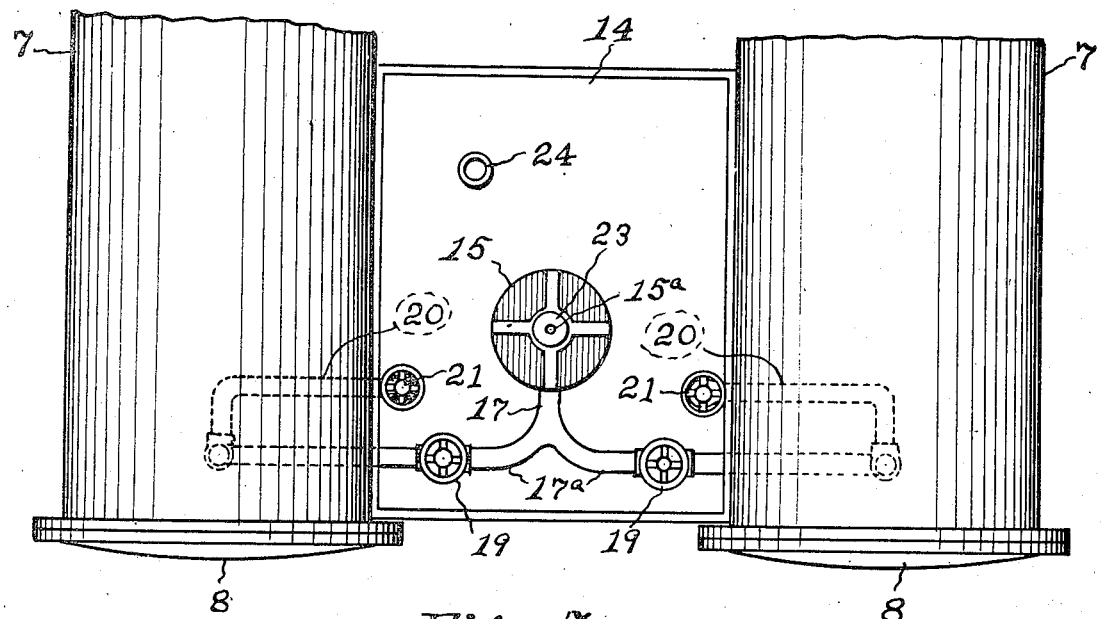
Figure 5 is a plan view of one end of the apparatus shown by Fig. 4, the cover of the tank being removed.
Figure 6:
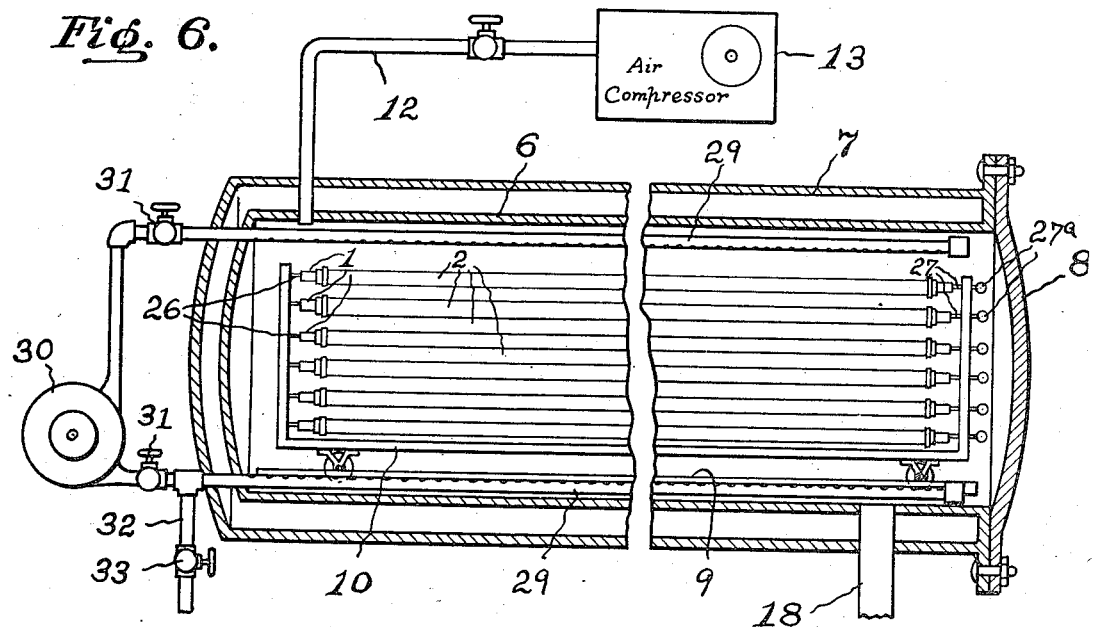
Figure 6 is a longitudinal, sectional view thru a vulcanizing device which is constructed in accordance with the invention, showing a number of tubes in place therein preparatory to being vulcanized.
Figure 7:
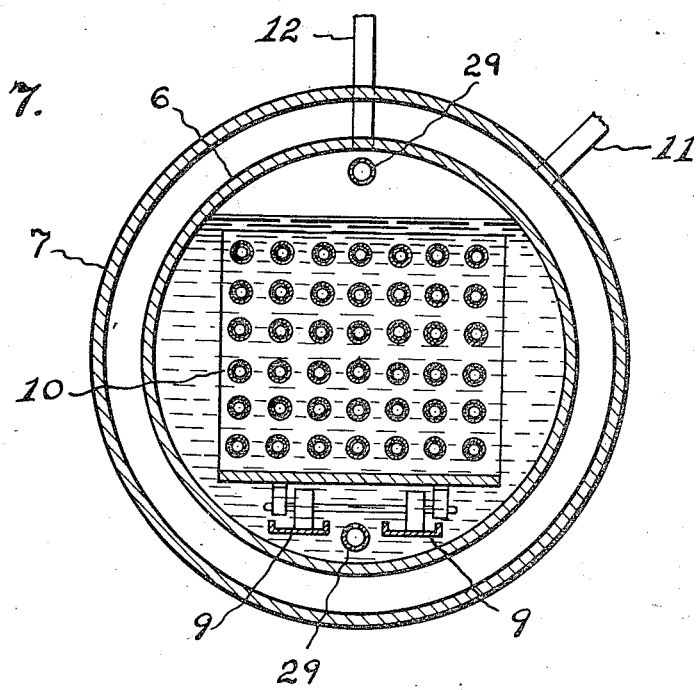
Figure 7 is a transverse sectional view thru the vulcanizing apparatus, showing a number of tubes in the process of being vulcanized therein.

While the invention in some aspects may be used for producing other rubber articles it will, for the purpose of illustration, be disclosed in certain forms and embodiments which are more especially adapted to be used for the manufacture of rubber tubes. In manufacturing rubber tubes, a sheet of rubber compound or unvulcanized rubber is ordinarily rolled upon a cylindrical tube or mandrel 1. The rubber compound is indicated by the numeral 2 on the drawings, and by reference to Fig. 3, it will be seen that unless the rubber compound is tightly squeezed or compressed against the mandrel, a small air pocket 3 will remain at the inner edge of the sheet of rubber compound, with the result that there will be an objectionable seam on the finished tube at this point. According to the old method of making tubes, the rubber stock is tightly squeezed or compressed against the mandrel by wrapping it with fabric which is wound spirally thereon under tension. This is not done in practicing the present invention, although the ends of the rubber stock are secured to the mandrel to prevent the entrance of steam, water or air between the mandrel and the rubber stock. In Fig. 1, the ends of the rubber stock are shown as engaged by the clamping rings or bands 4 which are applied to the mandrel and extend over the edges of the rubber stock. In Fig. 2, bands 5 fit around the end portions of the rubber stock and clamp the same against the mandrel. Either the rings 4, bands 5, or any other equivalent means may be provided for clamping the end portions of the rubber stock against the mandrel. This is all that is necessary to prepare the tubes for vulcanizing.

The vulcanizing apparatus is shown by Figs. 4 to 7 inclusive, and this apparatus may have a duplex form so that one side thereof can be discharged of its contents and again recharged during the period of time that the articles charged into the other side are being vulcanized. There are two of the vulcanizing chambers 6 which are constructed and equipped in an identical manner, and arranged so that they can be charged alternately. Each of the vulcanizing chambers is provided with a steam jacket 7, and has an open end which can be tightly closed by means of a removable cover 8. Suitable track members 9 may be arranged within the vulcanizing chambers so that wheeled trucks 10, of any suitable character such as those shown on Figs. 6 and 7 for illustrative purposes may be rolled into or out of the vulcanizers. The covers 8 are removably secured to the open ends of the vulcanizing chambers in any suitable manner as by means of clamping bolts, and these covers provide airtight closures when they are in position. A steam pipe 11 leads to the jacket 7 of each of the vulcanizers, and an air pipe 12 leads to the top of each of the vulcanizing chambers 6. Each of the air pipes is connected with a source of compressed air supply, such as the air compressor 13, which is shown diagrammatically by Fig. 6.

Arranged between the two vulcanizing chambers 6 is a tank 14 into which the liquid contents of either of the vulcanizing chambers can be drained. A centrifugal pump 15 is arranged within the tank 14, being suitably mounted therein in any suitable manner, and having an inlet pipe 16 which projects into a pocket 14ª at the bottom of the tank. The outlet or discharge pipe 17 of the centrifugal pump is provided with a pair of branches 17ª, which communicate with water pipes 18, leading to the bottom of the respective vulcanizing chambers 6. These water pipes 18 are provided with the respective valves 19 so that the centrifugal pump 15 can be utilized for pumping water from the tank 14 into either one of the vulcanizing chambers, depending upon the adjustment of the valves. A drain pipe 20 is connected with each of the water pipes 18 at a suitable point in the length thereof. These drain pipes lead to the tank 14 and are each provided with a valve 21. When it is desired to drain the contents of either one of the vulcanizing chambers 6 into the tank 14, the corresponding valve 19 is closed, and the corresponding valve 21 opened. The adjustment of the valves 19 and 21 is reversed when the centrifugal pump is utilized for forcing water from the tank into the vulcanizing chamber. A removable cover plate 22 closes the top of the tank. The valves are provided with handles which extend upwardly thru the cover plate so that they can be manipulated without difficulty, and the shaft 15ª of the centrifugal pump extends upwardly thru the cover, and has a pulley 23 applied to the upper end thereof so that power can be readily applied to the pump. A conventional overflow pipe 24 is arranged within the tank so that the tank will drain into the sewer before it overflows.

The mandrels 1, with the uncured rubber tubes thereon are mounted upon the carriers or trucks 10 in any suitable manner, so that they are held out of engagement with each other. This may be accomplished in any desired or suitable manner, and in Fig. 6 the tubular mandrels are shown as engaged at their opposite ends by the pins 26 and 27 respectively, the pins 27 being slidable and having finger pieces 27ª at their outer ends so that they can be easily moved into and out of engagement with the mandrels. The construction of the carriers or trucks and the manner of mounting the mandrels thereon, however, is not at all material or essential to the invention, and any desired means can be utilized for supporting the mandrels within the vulcanizer during the vulcanizing process. With the construction shown, a truck or carrier 10 is wheeled into the vulcanizing chamber, after which the cover 8 is secured in position and the chamber tightly sealed thereby. It is desired to subject the rubber tubes to a high pressure while being vulcanized. The exact amount of this pressure may be varied as may be found advantageous, tho for ordinary purposes, I have found that satisfactory results can be obtained by using a pressure of about 125 pounds per square inch. What is known as the wet process is used for vulcanizing the tubes, and, of course, it is not possible to use steam at a pressure of 125 pounds per square inch, since steam at this pressure has a temperature of about 353 degrees Fahrenheit, which is so hot that it would destroy rubber or gum stock instead of vulcanizing it. The proper vulcanizing temperature is about 290 degrees Fahrenheit, and steam at this temperature has a pressure of only 45 pounds per square inch, which is not a sufficient amount of pressure to avoid the necessity of tightly wrapping the gum stock on the mandrels with fabric, as has heretofore been done where the articles to be vulcanized are directly subjected to the action of the live steam.

According to the present invention, the live steam is introduced thru the steam pipe 11 into the steam jacket 7 of the vulcanizing chamber, and this steam has a pressure of about 45 pounds per square inch, so that the proper vulcanizing temperature of 292 degrees Fahrenheit is maintained. At the same time, a pressure of about 125 pounds per square inch is maintained within the vulcanizer by means of air pressure, although when the wet process of vulcanizing is used, it is not possible to allow the air to come in direct contact with the rubber stock, and the rubber must be protected from the air by moisture. This can be done by covering the rubber stock with water, although it is preferable to submerge the rubber tubes or articles being vulcanized in water, as before noted. With the construction shown, the valves are set in the proper manner and the centrifugal pump 15 operated to force water from the tank 14 into the vulcanizing chamber. When a sufficient amount of water has been forced into the chamber to completely cover the tubes or rubber articles, the pump is stopped and the valve 19 closed. An air space is left at the top of the vulcanizing chamber, above the surface of the water, the vulcanizers being provided with suitable water gauges 28, so that the operator can tell when the required amount of water has been pumped into the vulcanizer.

The proper vulcanizing temperature is produced and maintained by the live steam in the jacket 7, while the compressed air maintains a pressure of approximately 125 pounds per square inch on the interior of the vulcanizer. This pressure is of course transmitted thru the water to the tubes, with the result that the tubes are forced tightly against the mandrels. This high pressure acting upon the tubes and forcing them against the mandrels takes the place of the tight fabric wrapping which has previously been used for this purpose, and the expense and labor of using the fabric wrapping is thus entirely avoided.

After the articles have been vulcanized, the water from the vulcanizers is drained back into the tank 14. This water is, of course, at the vulcanizing temperature of 290 degrees Fahrenheit, so that part of it will escape and be lost as steam, although most of the water will be saved, and the heat therein conserved. This will avoid the necessity of heating a fresh quantity of water each time the vulcanizer is charged, and a considerable saving may be effected in this manner where the vulcanizer is used continuously.

It is preferable to provide some means for circulating the water in the vulcanizer, so that a uniform temperature may be maintained at all points within the vulcanizer. This may be accomplished in many ways, and one possible way is shown on the drawings, in which perforated pipes 29 extend along the top and bottom respectively of the vulcanizer. These pipes are connected at the rear end of the vulcanizer by suitable connections and fittings to a centrifugal pump 30. A valve 31 is provided for each of the pipes so that the outer ends of the pipes can be tightly closed when the pump is not in operation. However, when this pump is in operation, water is carried thru the lower pipe to the centrifugal pump and driven by the pump into the upper perforated pipe which discharges it into the top of the vulcanizer. Water is thus taken from the bottom of the vulcanizer and discharged into the top of the vulcanizer, and the circulation of the water which is thus produced will result in maintaining an even temperature thruout the entire body of water within the vulcanizer. The lower perforated pipe 29 is also shown as connected at its rear end with a steam pipe 32. This steam pipe 32 has a valve 33 which is normally closed, although by closing the two valves 31 and opening the valve 33, steam will enter the lower perforated pipe and act upon the water to agitate or circulate the same, to the end that an even temperature may be maintained.

As will be apparent from Figures 1 and 2, the mandrels 1 are not only hollow but they are open at their opposite ends so that when the same are mounted on the support or carrier 10, and disposed within the vulcanizer, the water in the vulcanizer, or other fluid, may freely circulate through the bodies of the mandrels grouped in position with the tubes thereon intended to be vulcanized. By reason of this construction of the mandrels and the fact that according to my process the water used as the submerging medium within the vulcanizer when caused to circulate by the positive means hereinbefore set forth will be adapted to uniformly heat the mandrels interiorly thereof, the uniformity of the product obtained as regards the quality of the tubes manufactured being thus enhanced, and the vulcanizing of the tubes being accelerated.

The invention consists in both the process and apparatus, and while one form of apparatus has been illustrated and described in detail, it will be understood that many modifications and changes can be made in the details of construction without departing from the spirit of the invention, and the scope of the claims.

The use of water as the vulcanizing medium gives rise to many advantages in addition to those previously noted. Water contains little or no free oxygen and hence has no tendency to oxidize the rubber stock during vulcanization. Besides, water is capable of absorbing and dissolving many of the substances, volatile or otherwise, given off or migrating from the rubber stock during vulcanization. Perhaps of even greater importance, water may be and actually is absorbed by the rubber stock during vulcanization and thus not only prevents the stock from being robbed of its natural moisture, but actually saturates it in a beneficial way, promoting vulcanization and improving the quality of the final vulcanized product.

Having described my invention, what I claim as new, and desire to secure by Letters Patent, is:

1. The method of vulcanizing rubber tubes for vehicle tires, which consists in placing the tubes to be vulcanized upon poles or mandrels, sealing the open ends of the tubes to the mandrels, and vulcanizing the tubes while upon the mandrels and in the absence of external confining means solely by direct contact with water or a similar liquid heated to the desired temperature for vulcanization.

2. The method of vulcanizing rubber tubes for vehicle tires, which consists in placing the tubes to be vulcanized upon poles or mandrels, sealing the open ends of the tubes to the mandrels, vulcanizing the tubes while upon the mandrels and in the absence of external confining means solely by direct contact with water or a similar liquid heated to the desired temperature for vulcanization, and before the tubes become set subjecting them to a sustained external pressure in excess of the vulcanizing temperature pressure.

3. The method of vulcanizing rubber tubes for vehicle tires, which consists in forming the tubes to be vulcanized of compounded gum stock without fabric reinforcement, sealing the open ends of the tubes to internal imperforate poles or mandrels, and subjecting the tubes while upon the mandrels and in the absence of external confining means to direct contact with water or a similar liquid heated to the desired temperature for vulcanization while preventing oxidation of the tubes before the water is brought into contact therewith.

4. The method of vulcanizing rubber tubes for vehicle tires, which consists in placing the tubes to be vulcanized upon imperforate poles or mandrels, sealing the open ends of the tubes to the mandrels without first expelling the air trapped between the tubes and mandrels, subjecting the tubes while upon said mandrels and in the absence of external confining means to direct contact with water or a similar liquid heated to the desired temperature for vulcanization while preventing oxidation of the tubes before the water is brought into contact therewith, and setting the tubes under an external pressure in excess of the vulcanizing temperature pressure.

5. The method of vulcanizing rubber tubes for vehicle tires, which consists in placing the tubes to be vulcanized upon poles or mandrels, sealing the open ends of the tubes to the mandrels, placing the mandrels with the tubes thereon and in the absence of external confining means in a suitable vulcanizing receptacle, admitting water or a similar liquid into said receptacle to submerge the tubes while the water is at a temperature too low for vulcanization, then heating the water to the desired temperature for vulcanization, and maintaining the water during the setting period under a pressure in excess of the vulcanizing temperature pressure.

6. The method of vulcanizing rubber tubes for vehicle tires, which consists in placing the tubes to be vulcanized upon poles or mandrels, sealing the open ends of the tubes to the mandrels, placing the mandrels with the tubes thereon and in the absence of external confining means in a suitable vulcanizing receptacle, admitting water or a similar liquid into said receptacle to submerge the tubes while the water is at a temperature too low for vulcanization, then heating the water to the desired temperature for vulcanization, and producing a forced circulation of the water as it is heated to the desired vulcanizing temperature.

7. The method of vulcanizing rubber tubes for vehicle tires, which consists in placing the tubes to be vulcanized upon poles or mandrels, sealing the open ends of the tubes to the mandrels, placing the mandrels with the tubes thereon and in the absence of external confining means in a suitable vulcanizing receptacle, admitting water or a similar liquid below the final vulcanizing temperature into said receptacle to submerge the tubes, heating the water up to said temperature, and maintaining within the receptacle a pressure in excess of the prevailing temperature pressure when the water is heated to a vulcanizing temperature.

8. The method of vulcanizing rubber tubes for vehicle tires, which consists in building the tubes to be vulcanized of laminated form from compounded gum stock without fabric reinforcement, sealing the open ends of the laminated tubes by clamping said ends to internal imperforate poles or mandrels, subjecting the tubes while upon the mandrels and in the absence of external confining means to direct contact with water or a similar liquid heated to the desired temperature for vulcanization, and setting the tubes under an external pressure in excess of the vulcanizing temperature pressure.

9. The method of vulcanizing rubber tubes for vehicle tires, which consists in placing the tubes to be vulcanized upon poles or mandrels, applying elastic bands to the opposite ends of the tubes to clamp them to the mandrels and thus seal the open ends of the tubes, and subjecting the tubes while upon the mandrels and in the absence of external confining means to direct contact with water or a similar liquid heated to the desired temperature for vulcanization.

10. The method of vulcanizing rubber tubes for vehicle tires, which consists in placing the tubes to be vulcanized upon hollow, open-ended poles or mandrels, sealing the open ends of the tubes to the mandrels, placing the mandrels with the tubes thereon and in the absence of external confining means in a suitable vulcanizing receptacle, admitting water or a similar liquid into said receptacle to submerge the tubes, heating the water to the desired temperature for vulcanization, and causing the water to circulate through the hollow, open-ended mandrels to insure a substantially uniform heating of the tubes during vulcanization.

11. The method of vulcanizing rubber tubes for vehicle tires, which consists in forming the tubes of compounded gum stock without fabric reinforcement and in the absence of external confining means, saturating the tubes with water under pressure while preventing oxidation of the tubes before saturation, and subjecting the tubes while thus saturated to the desired vulcanizing heat.

12. As a new article of manufacture, a rubber vehicle tire tube vulcanized upon an imperforate pole or mandrel with its open ends sealed thereto and in the absence of external confining means solely by direct contact with water heated to the desired vulcanizing temperature and under a pressure substantially in excess of the vulcanizing temperature pressure.

13. As a new article of manufacture, a vulcanized vehicle tire tube composed of compounded gum stock substantially identical with that composing the standard steam-cured tube but which, as compared to said standard steam-cured tube, possesses greater uniformity of texture and strength throughout and greater elongation, ages more slowly and offers greater resistance to tear, is softer and more pliable, and exhibits less free sulphur blooming, said tube being vulcanized in water at substantially the same temperature as the standard steam-cured tube but under a pressure substantially greater than the pressure of steam at the vulcanizing temperature.

In testimony whereof I affix my signature.

LAURITS A. LAURSEN.